United States Patent

[11] 3,615,838

| [72] | Inventor | Albert C. Erickson |
| | | 28 Coolidge Park, Wakefield, Mass. 01880 |
| [21] | Appl. No. | 728,164 |
| [22] | Filed | May 10, 1968 |
| [45] | Patented | Oct. 26, 1971 |

[54] FUEL CELL UNIT WITH NOVEL FLUID DISTRIBUTION DRAIN, AND VENT FEATURES
11 Claims, 10 Drawing Figs.

[52] U.S. Cl............................................. 136/86, 136/159
[51] Int. Cl.......................................... H01m27/02
[50] Field of Search............................ 136/86, 159, 160

[56] References Cited
UNITED STATES PATENTS

| 3,146,131 | 8/1964 | Linden et al. | 136/86 |
| 3,278,336 | 10/1966 | Uline et al. | 136/86 |
| 3,298,867 | 1/1967 | Diotalovi | 136/86 |
| 3,445,294 | 5/1969 | Leonard | 136/86 |

*Primary Examiner*—Allen B. Curtis
*Attorneys*—Nathan J. Cornfeld, Carl O. Thomas, Frank L. Neuhauser, Oscar B. Waddell and Melvin M. Goldenberg

ABSTRACT: A fuel cell is provided with reactant and electrolyte gaskets each defining a central area having a fluid distributor located therein. The electrolyte gasket is provided with notched or apertured fingers to uniformly distribute fluid while the reactant frames may be similarly constructed or provided with stacked screens having offset apertures.

PATENTED OCT 26 1971 3,615,838
SHEET 1 OF 3
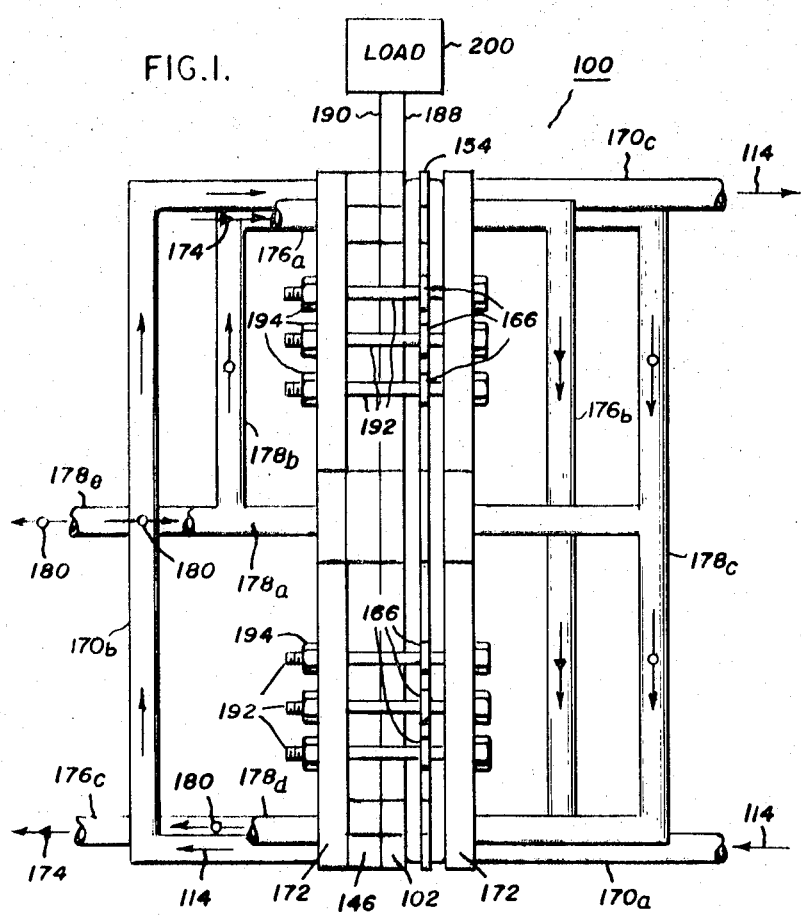
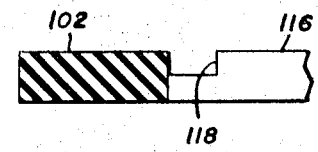
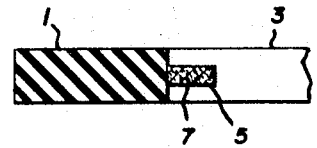
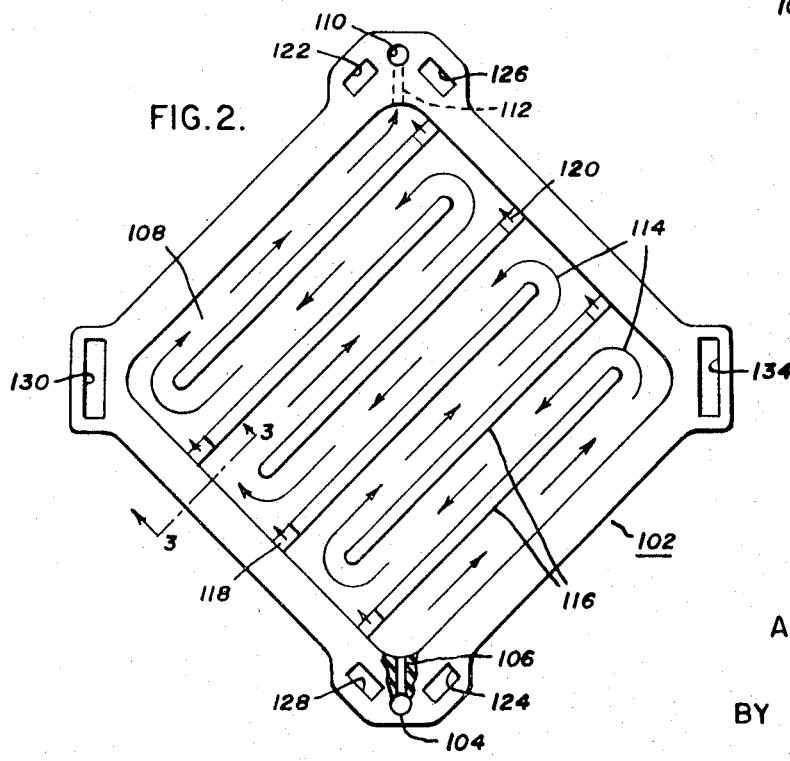
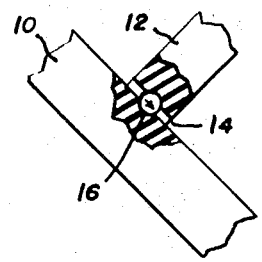
INVENTOR:
ALBERT C. ERICKSON,
BY *Carl A. Thomas*
HIS ATTORNEY.

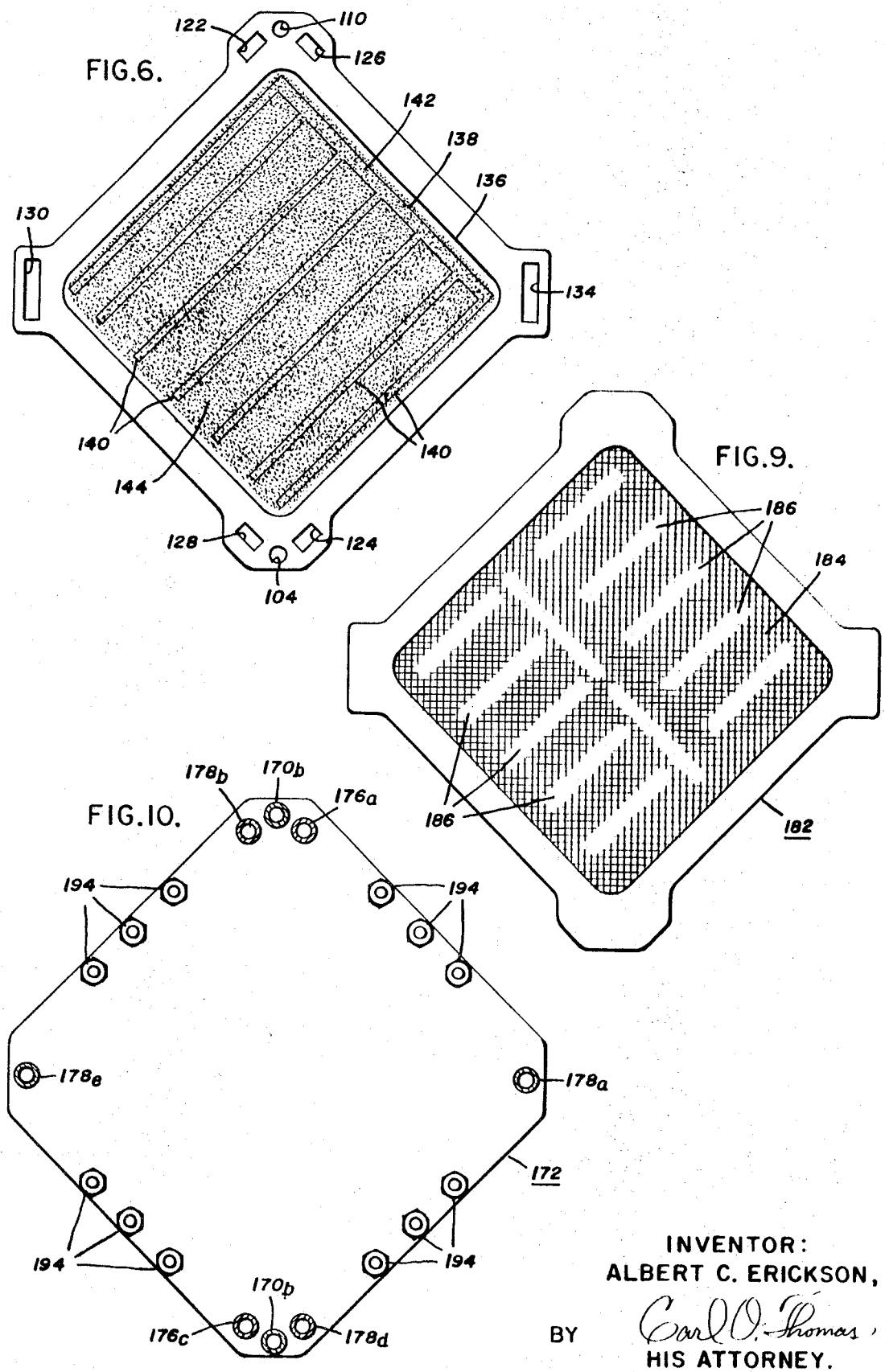

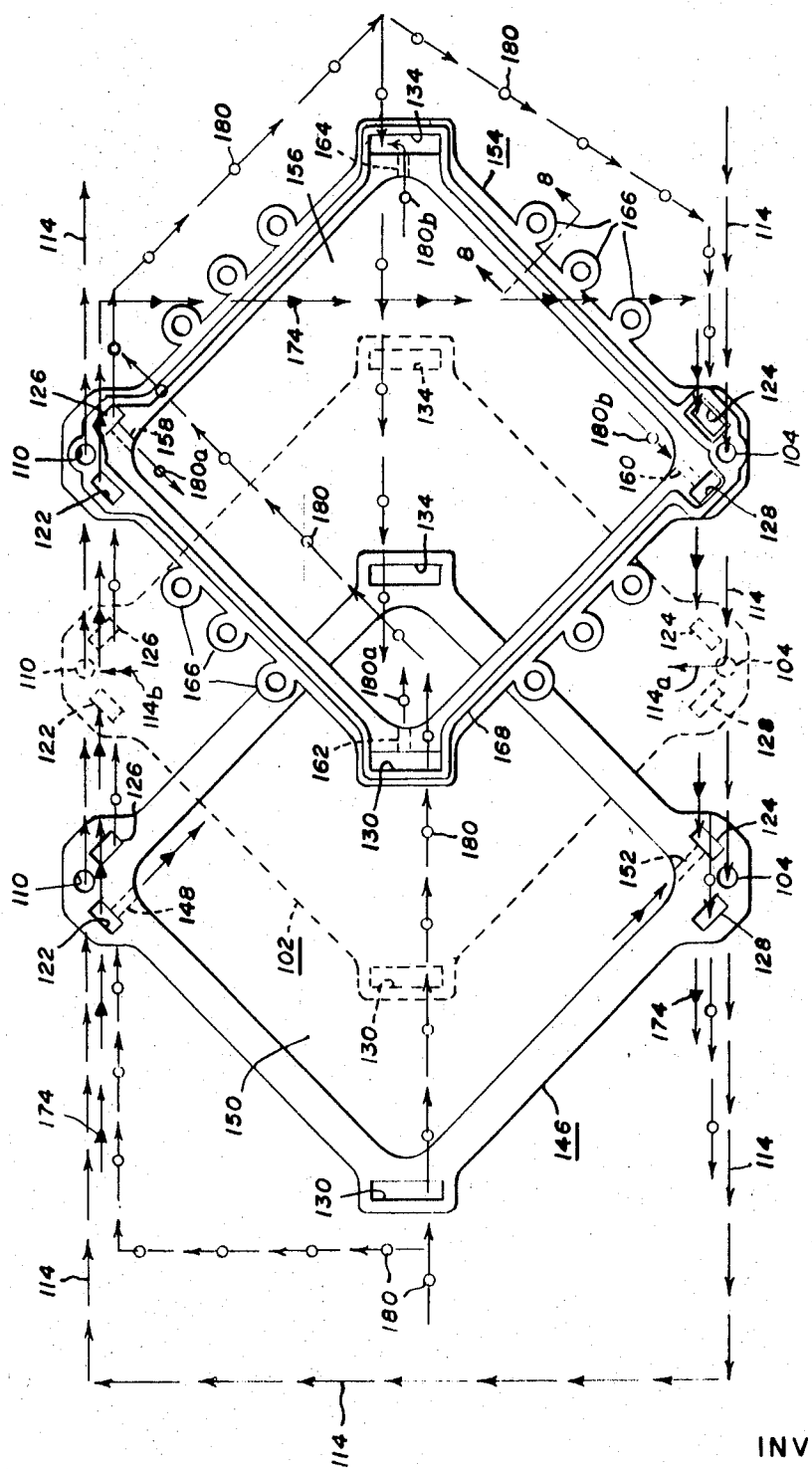

FUEL CELL UNIT WITH NOVEL FLUID DISTRIBUTION DRAIN, AND VENT FEATURES

BACKGROUND OF THE INVENTION

The essential elements of a fuel cell unit are an anode, a cathode, and an electrolyte providing an ion transport path therebetween. Typically a housing (usually the combination of an end plate and peripheral gasket) is provided to seal around the periphery of the anode and to permit a fluid fuel, such as hydrogen, hydrocarbon, ammonia, alcohol, etc., to be circulated across the face of the anode in a controlled manner. The cathode may be merely exposed to the atmosphere where air is the oxidant. More typically, however, a second housing, similar to that associated with the anode, is sealed around the periphery of the cathode to direct an oxidant across the face of the cathode. The electrolyte may be a liquid, such as a mineral acid—e.g. sulfuric acid, phosphoric acid, etc.,—or an alkali, such as potassium hydroxide. In such circumstances an electrolyte frame or gasket is interposed between and sealingly engaged peripherally of the anode and cathode. The liquid electrolyte is usually circulated through the frame during operation of the fuel cell unit. The various elements of a fuel cell unit are usually held in assembled and edge-sealing relationship by peripherally positioned bolts. Typical fuel cell constructions of the type disclosed are illustrated by Niedrach in U.S. Pat. No. 3,134,697 and Grubb in U.S. Pat. No. 3,328,204. In building fuel cell units to service all but the smallest power requirements it is conventional practice to stack a plurality of elements similar to those employed in the construction of a single cell unit as described above so as to form a battery of fuel cells—frequently termed a fuel battery.

In order to insure uniform distribution of one or more of the fluids being circulated through a fuel cell it has heretofore been suggested to provide one or more of the confining frames with baffle fingers. These fingers extend into the central open area defined by the frame and cause the fluid to follow a tortuous or labyrinthine path in progressing from its inlet to its outlet. This causes the fluid to sweep the central area in more or less a uniform manner rather than following a near straight line flow path between the inlet and outlet.

While baffling has worked out reasonably well with gaseous fluids, certain disadvantages have been encountered in baffling liquids. Since there are in most cases small quantities of gases associated with the liquids, it has been noted that baffle fingers incorporated in frame constructions may produce gas traps within a cell which block contact of the liquid being circulated with a substantial fraction of the electrode area. In other instances the baffle fingers have been noted to trap liquid when it is attempted to drain the cell on shut down. This is particularly undesirable where the fluid is of a type that tends to be viscous on cooling. For example, concentrated acids and alkalis are quite fluid at the operating temperatures of such fuel cells, but are solid or very nearly solid at room temperature. Unless arrangement is provided to remove the trapped liquid, it is necessary to provide for preheat of a fuel cell unit to near operating temperatures before power can be drawn and circulation begun.

SUMMARY OF THE INVENTION

It is an object of my invention to provide a fuel cell unit suitably constructed to efficiently confine and direct fluids circulating therethrough while minimizing any tendency to trap fluids therein.

This and other objects of my invention are accomplished by providing a fuel cell unit which, in one aspect, is provided with first and second electrode means. Means are provided for permitting contact of a liquid electrolyte with the electrode means, means are provided for permitting contact of a fluid fuel with the first electrode means, and means are provided for permitting contact of a fluid oxidant with the second electrode means. The fuel cell unit is improved in that at least one of the contact permitting means is comprised of a frame peripherally sealingly cooperating with at least one of the electrode means and defining a central open area. A plurality of baffle fingers extend into the open area from the frame and at least a portion of the fingers define fluid passage means therethrough.

BRIEF DESCRIPTION OF THE DRAWINGS

My invention may be better understood by reference to the following detail description considered in conjunction with the drawings, in which FIG. 1 is an elevation of a fuel cell unit constructed according to my invention, FIG. 2 is an elevation of an electrolyte frame or gasket, FIG. 3 is a sectional detail taken along section line 3—3 in FIG. 2, FIG. 4 is a sectional detail of a modified electrolyte frame, FIG. 5 is a detail, partly in section, of another modified electrolyte frame, FIG. 6 is an elevation of an electrode-electrolyte assembly, FIG. 7 is an elevation of two reactant directing gaskets with the electrolyte directing frame being shown in phantom and the flow path of electrolyte and reactants being schematically indicated, FIG. 8 is a section taken along line 8—8 in FIG. 7, FIG. 9 is an elevation of a gasket and fluid distributor in combination, and FIG. 10 is an end view of my fuel cell unit.

DETAILED DESCRIPTION OF THE PREFERRED EMBODIMENT

THe fuel cell unit 100 is provided with an electrolyte frame or gasket 102, best illustrated in FIG. 2. An aperture 104 is provided in the lower corner of the frame below the open area for the circulation of a liquid electrolyte. An embedded conduit 106 communicates the aperture 104 with a central open area 108 defined by the frame. An aperture 110 is provided in the upper corner of the frame above the central area, and a conduit 112 is provided communicating the central area with the upper aperture. To insure that the electrolyte, designated schematically by flow arrows 114, sweeps in a substantially uniform manner through the central area, a plurality of baffle fingers 116 are provided extending from the frame into the central area. The baffle fingers are provided with notches 118 adjacent their point of intersection with the frame. A small fraction of the electrolyte passes through the notches as indicated by flow arrows 120. The notches located at the upper extremity of the baffle fingers are provided to prevent gases entrained in the electrolyte from being trapped by the baffle fingers. Without notches small gas pockets would be likely to form beneath each downwardly extending baffle finger adjacent its point of connection with the frame. The notches provided in the lower extremity of the baffle fingers are included to allow liquid electrolyte to be completely drained from the unit during shut down rather than being trapped by the baffle fingers.

This is of particular importance when an electrolyte is employed which solidifies during cooling, such as concentrated sulfuric or phosphoric acid or concentrated or fused alkali. Allowing the electrolyte to solidify within the fuel cell unit during shut down would require heating of the unit to operating temperature prior to start up. It is usually more convenient and more efficient to heat the electrolyte within an external storage plenum. The electrolyte frame is shown provided with first reactant circulation apertures 122 and 124 adjacent the upper and lower corners, respectively. Second reactant circulation apertures 126 and 128 are similarly located adjacent the upper and lower corners, respectively. Auxiliary second reactant apertures 130 and 134 are located adjacent the remaining corners of the electrolyte frame.

FIG. 4 illustrates a modified electrolyte frame 1 provided with a baffle finger 3. A bypass aperture 5 is provided in the baffle finger. The aperture is positioned in the baffle finger adjacent its intersection with the frame and, preferably, at the very edge of the central area. Except for the substitution apertures for notches in the baffle fingers, the electrolyte frame 1 may be identical in construction to frame 102. As an optional feature the apertures 5 in the downwardly depending baffle fingers may be filled with a gas-permeable, liquid-impermeable material 7. The material 7 may be formed of any porous substrate having its pores lined with hydrophobic material, such as a fluorocarbon polymer or the like. Because of its high hydrophobicity polytetrafluoroethylene is preferably used as a pore-lining material. In another form the material lying with the aperture 5 may be a cloth formed of a fluorocarbon polymer.

The purpose of placing a gas-permeable, liquid-impermeable material in the apertures 5 in the downwardly extending fingers is to prevent any substantial quantity of electrolyte from bypassing the baffle fingers through the apertures while allowing any gaseous material that might be present within the frame to be quickly and easily shunted to the outlet aperture 110.

FIG. 5 illustrates another modified form applicable to the upwardly extending baffle fingers. The frame 10 is provided with an upwardly extending baffle finger 12. A passage 14 is located in the baffle finger adjacent its intersection with the frame. A check valve 16 is schematically illustrated controlling flow through the passage. The function of the check valve is to prevent liquid from bypassing the baffle during operation of the fuel cell unit, but to allow liquid to be drained through the passage on shutdown of the fuel cell unit. The frame construction shown in FIG. 5 may be otherwise identical to the frame 102. It is recognized that the frame modifications illustrated in FIGS. 4 and 5 are not incompatible and may, if desired, be used in combination.

Noting FIG. 6, an ion exchange membrane 136 is sealed to the electrolyte frame overlying the open central area. A current collector 138 comprised of collector strips 140 and bus strip 142 (each of which are optional) together with an electrocatalyst 144 together form an electrode carried by the ion exchange membrane. An identical ion exchange membrane and electrode are mounted on the reverse side of the electrolyte frame. The electrodes and electrolyte frame together form an electrode-electrolyte assembly.

The provision for supply of fluid reactants to the electrodes of the electrode-elctrolyte assembly as well as circulation of electrolyte is illustrated in FIG. 7. A first reactant frame or gasket 146 is provided with first reactant circulation apertures 122 and 124 located in alignment with the corresponding apertures in the electrolyte frame. A conduit 148 embedded in the first reactant frame communicates the aperture 122 with a central open area 150 defined by this frame. A similar conduit 152 communicates the central area with the aperture 124. The first reactant frame is also provided with second reactant apertures 126, 128, 130, and 134 as well as electrolyte apertures 104 and 110. The fundamental difference between the electrolyte and first reactant gaskets is that the former are provided with conduits communicating the electrolyte conduits with the central area defined by the gasket while the latter are provided with conduits which connect the first reactant conduits with the central area.

A second reactant frame or gasket 154 is located adjacent a face of the electrode-electrolyte assembly opposite that of the first reactant frame. The second reactant gasket is provided with apertures 104, 110, 122, 124, 126, 128, 130, and 134, which correspond to and are aligned with like-numbered apertures in the electrolyte and first reactant frames. A significant difference in the second reactant frame is that the apertures 126, 128, 130, and 134 are communicated with an open central area 156 of the gasket by means of conduits 158, 160, 162, and 164, respectively. About its exterior periphery the gasket 154 is provided with a plurality integrally formed eyelets 166.

Identical sealing beads 168 are formed on the opposite faces of the second reactant gasket. The sealing beads are located exteriorly of each of the apertures. Additionally, the apertures which are not communicated with the central open area by conduits are completely surrounded by the sealing beads, the beads being located both interiorly and exteriorly of these apertures to prevent fluid flow either into or from the second reactant frame.

The pattern of fluid flow with respect to the first reactant, second reactant, and electrolyte gaskets is schematically illustrated by flow arrows. The pattern of electrolyte circulation is indicated by flow arrows 114. Considering FIGS. 1, 2, 7, and 10 together, it can be seen that electrolyte enters the fuel cell unit through an electrolyte conduit 170a sealingly connected to a rigid end plate 172. The electrolyte flows through the apertures 104 in the reactant and electrolyte frames. A portion of the electrolyte, as indicated by flow arrow 114a in FIG. 7, passes through the conduit 106 embedded in the electrolyte frame to reach the central open area 108.

The conduit is properly sized to allow the desired fraction of the electrolyte stream to enter the electrolyte frame. The remainder of the electrolyte continues through the apertures 104 and is available to other electrolyte frames included in the frames and gaskets stacked to form the fuel cell unit. An electrolyte conduit 170b directs a small portion of the electrolyte which does not enter the inlet conduits of any of the electrolyte frames from the lower portion of the end plate to the upper portion. This portion of the electrolyte is then directed through apertures 110 in the frames. The main portion of the electrolyte that was diverted from the electrolyte stream through the conduit 106 of each electrolyte frame is returned to the electrolyte stream passing through the apertures 110 by passing through conduits 112. This is schematically illustrated by flow arrow 114b in FIG. 7. The electrolyte conduit 170c carries electrolyte away from the fuel cell unit.

The flow path of the first reactant is schematically indicated by flow arrows 174. The first reactant enters the fuel cell unit through a first reactant conduit 176a attached to one of the rigid end plates. The first reactant flows through apertures 122 and 124 in the stacked frames. Flow between these apertures is through first reactant conduit 176b connected to the remaining of the end plates. The main portion of the first reactant enters the open area 150 of each first reactant frame through conduit 148 and exits through conduit 152. The first reactant leaves the fuel cell unit through the first reactant conduit 176c.

A second reactant conduit 178a is connected with a rigid frame to communicate the second reactant, schematically designated by flow arrows 180, with the apertures 130. A branch conduit 178b communicates the second reactant with the apertures 126. Second reactant conduit 178c interconnects second reactant flow stream from the apertures 126 and 130 and delivers the second reactant to the apertures 128 and 134. The conduit 178c is sealingly fitted to the remaining rigid frame. The main portion of the second reactant enters each second reactant gasket as through conduits 158 and 162 as indicated by flow arrows 180a and leaves the second reactant gasket through conduits 160 and 164 as indicated by flow arrows 180b. The second reactant leaves the fuel cell unit through conduits 178d and 178e. For most applications the conduits 170b, 176b and 178c may be omitted entirely; none of the fluid flow being allowed to bypass the interior of the gaskets.

In FIG. 7 no means are illustrated for achieving uniform distribution of either of the reactants within the central areas 150 and 156 defined by the first reactant frame 146 and second reactant frame 156. Since fuel cell units are capable of tolerating, at least for low power densities and short operating periods, fairly nonuniform flow of reactants adjacent the electrodes, it is not essential that any flow distribution means be provided. To achieve optimum performance, however, it is preferred that means for distributing the reactants be located within the central areas defined by these gaskets. The distributing means are omitted from FIG. 7 for purposes of simplifying the figure.

In one preferred form either or both of the reactant frames may be formed with baffle fingers similar to baffle fingers 116, 3, and 12 described in connection with FIGS. 2 through 5 inclusive. Where a liquid reactant is utilized as opposed to a gaseous reactant the baffle fingers may be provided with notches, apertures, or passages as described in connection with frames 102, 1, and 10. It is readily appreciated that the electrolyte frame may be converted to a reactant frame merely by relocating the conduits communicating the apertures and the central open area.

FIG. 9 illustrates an alternate arrangement that may be utilized to more uniformly distribute fluid within the open central areas defined by the frames. For purposes of illustration, a frame 182 is schematically illustrated which may be suitably apertured to serve either as a reactant or electrolyte frame or gasket. A distributor screen 184 is located within the central open area defined by the frame. THe distributor screen is provided with a plurality of apertures 186. The function of the apertures is to provide flow paths for the fluid within the central area of reduced impedance as compared with fluid flow through the screens. Accordingly, fluid flowing between the inlet and outlet conduits in the frame will first permeate the screen tending to follow the path of least resistance in the direction of the outlet conduits. Upon entering one or more of the areas defined by the apertures the fluid will enter a very low resistance to lateral flow and the flow path will spread over a wide portion of the central area. The fluid flow will thereby become more uniformly distributed over the central area. Instead of using a distributor screen it is appreciated that any fluid pervious material could be substituted. The distributor technique may be usefully employed in conjunction with either gaseous or liquid fluids. If desired, a plurality of distributor screens may be utilized within any given gasket rather than a single screen as illustrated. In such instance the apertures in the screens are preferably positioned out of alignment. The use of distributor screens is more fully disclosed by Thumim et al. in patent application Ser. No. 727,790, titled FUEL CELL UNIT WITH NOVEL FLUID CONFINING AND DIRECTING FEATURES, filed on even date herewith, the disclosure of which is incorporated by reference.

In forming a fuel cell unit according to my invention any number of frames and gaskets may be stacked together, depending on the number of cells that are required to meet the power requirements to be placed on the unit. The three frame stack illustrated in FIG. 7 is the minimum number of frames necessary to form a fuel cell unit. In FIG. 1 the fuel cell unit 100 is shown merely for purposes of illustration as a unit containing a single fuel cell. The cell incorporated in the unit is schematically shown to be electrically connected to an electrical load 200 by means of leads 188 and 190. To hold the stacked frames and gaskets in assembled relation, a plurality of tie rods 192 are positioned around the periphery of the cell unit. The tie rods engaged by nuts 194. Instead of using end plates and tie rods as illustrated peripheral rigid frames may be substituted as disclosed in the above-noted Thumim et al. application. It is noted that where the gaskets are formed of flexible material it may be desirable to have the tie rods pass through the gaskets. To illustrate this arrangement the second reactant gasket is shown provided with integral apertured loops extending around the tie rods.

The advantages of my invention may be obtained with a fuel cell unit in which at least one liquid is being circulated. Most commonly circulated liquids are electrolytes. However, reactants are frequently utilized in liquid form. Such liquid fuels as liquid hydrocarbons, alcohols, and carboxylic acids are known to the art. Even oxidants may be circulated through a fuel cell in liquid form. Note, for example, that aqueous solutions of hydrogen peroxide have been utilized as fuel cell oxidants. To achieve the advantages of my invention it is only necessary to utilize a frame having baffle fingers constructed according to my invention in combination with a circulated liquid. Where one or both of the reactants are circulated in liquid form my invention may be put to practice even if a solid electrolyte, such as matrix immobilized acid or alkali or ion exchange structure constitutes the sole electrolyte. It is anticipated that my invention will most commonly be practiced with a liquid electrolyte in a fuel cell unit utilizing gaseous reactants.

While I have described my invention with reference to a specific, preferred embodiment it is appreciated that numerous variations may be incorporated without departing from my inventive teachings. For example, it is not necessary that ion exchange membranes be mounted on opposite sides of the electrolyte frame. Any conventional fuel cell electrode may be mounted on the opposite sides of the electrolyte frame directly or supported on an ion exchange membrane or on a porous support material.

It is unnecessary to provide conduits embedded in the frames and gaskets. Ports or channels may be utilized which do not have separate conduit elements positioned therein. I prefer to utilize rigidly formed conduits in flexible frames and gaskets to better control the accessibility of the areas within the frames by the fluids being circulated. The positioning and number of the apertures is not critical and may be varied widely. Two apertures are provided in each frame for the circulation of the first reactant whereas four apertures are provided for the circulation of the second reactant. This arrangement may be employed where hydrogen is the first reactant and air is the second reactant, since the high nitrogen content of air requires that larger volumes be circulated in spite of the stoichiometric relationship requiring two volumes of hydrogen for each volume of oxygen. It is readily apparent that if pure oxygen were substituted for air, the oxygen would be utilized in our fuel cell unit as the first reactant and hydrogen as the second reactant. The specific relation in size and number first reactant apertures and second reactant apertures were chosen in my preferred embodiment to accommodate a fuel cell unit operated on air and impure hydrogen produced by steam reforming a hydrocarbon.

The first reactant frames and the second reactant frames may be identically constructed in the form of either reactant frame specifically disclosed. According to a preferred stacking technique the electrolyte and the first reactant frames may be sealed together while the second reactant frames are maintained as separate elements. Where the electrode-electrolyte assembly provides a rough surface for sealing against the sealing beads of the second reactant frames, it is specifically contemplated that one or more gaskets may be interposed between the second reactant gasket and the electrolyte frame. Auxiliary gaskets may, of course, be interposed between any other adjacent frames, if desired, without departing from the teachings of my invention.

While I have described my invention with reference to a preferred embodiment and certain specific variations, it is appreciated that still other variations will readily occur to those skilled in the art after reviewing my teachings. It is accordingly requested that the scope of my invention be determined by reference to the following claims.

What I claim and desire to secure by Letters Patent of the United States is:

1. In a fuel cell unit comprised of
first and second spaced electrode means,
means for permitting a fluid fuel and a fluid oxidant to separately contact said first and second spaced electrode means, respectively, and
means for permitting circulation of a liquid electrolyte between said electrode means,
the improvement in which said electrolyte circulation permitting means is comprised of a frame peripherally sealingly cooperating with said electrode means and defining a central open area.
a plurality of baffle fingers extending into the open area from said frame, and
at least a portion of said fingers defining fluid passage means therethrough.

2. In a fuel cell unit according to claim 1 the added improvement in which said means for permitting the fluid fuel to contact said first electrode means is comprised of means for uniformly distributing the fluid fuel over said first electrode means.

3. In a fuel cell unit according to claim 2 the added improvement in which said means for uniformly distributing is comprised of a frame means peripherally sealingly cooperating with said first electrode means and defining a central open area, a plurality of baffle fingers extending into the open area from said frame means, and at least a portion of said fingers defining fluid passage means therethrough.

4. In a fuel cell unit according to claim 2 the added improvement in which said means for uniformly distributing is comprised of a frame means peripherally sealingly cooperating with said first electrode means and defining a central open area, and a fluid pervious element lying within the open area having apertures therein for the uniform distribution of said fluid fuel.

5. In a fuel cell unit according to claim 1 the added improvement in which said baffle fingers are joined to said frame at their upper extremity and said passage-defining means is located adjacent said upper extremity.

6. In a fuel cell unit according to claim 1 the added improvement in which said baffle fingers are joined to said frame at their lower extremity and said passage-defining means is located adjacent said lower extremity.

7. In a fuel cell unit according to claim 1 the added improvement in which said baffle fingers are interleaved in spaced relation.

8. In a fuel cell unit according to claim 6 the added improvement in which said passage defining means is comprised of means for selectively permitting fluid flow therethrough in one direction only.

9. In a fuel cell unit according to claim 5 the added improvement in which said passage-defining means is comprised of means for selectively permitting gas flow therethrough while inhibiting liquid flow.

10. In a fuel cell unit according to claim 1 the added improvement in which said frame is provided with at least one aperture for the circulation of the liquid electrolyte spaced from the open area and means are provided communicating the aperture and the central area for regulating flow of the liquid electrolyte therebetween.

11. In a fuel cell unit comprised of
first and second electrode means,
means for permitting contact of a liquid electrolyte with said electrode means,
means for permitting contact of a fluid fuel with said first electrode means,
for permitting contact of a fluid oxidant with said second electrode means,
the improvement in which at least one of said contact permitting means is comprised of a frame peripherally and sealingly cooperating with at least one of said electrode means and defining thereby a central open area,
a plurality of baffle fingers attached to said frame and extending into the open area from opposite sides of said frame, and
at least a portion of said fingers defining fluid passage means therethrough adjacent to said frame.

* * * * *